United States Patent
Jacobs

(10) Patent No.: US 7,168,525 B1
(45) Date of Patent: Jan. 30, 2007

(54) SELF-CHECKOUT METHOD AND APPARATUS INCLUDING GRAPHIC INTERFACE FOR NON-BAR CODED ITEMS

(75) Inventor: Eric L. L. Jacobs, Pointe Claire (CA)

(73) Assignee: Fujitsu Transaction Solutions, Inc., Frisco, TX (US)

( * ) Notice: Subject to any disclaimer, the term of this patent is extended or adjusted under 35 U.S.C. 154(b) by 571 days.

(21) Appl. No.: 09/710,137

(22) Filed: Nov. 10, 2000

Related U.S. Application Data

(60) Provisional application No. 60/244,234, filed on Oct. 30, 2000.

(51) Int. Cl.
*A63F 9/02* (2006.01)

(52) U.S. Cl. .................. 186/61; 235/383; 235/385

(58) Field of Classification Search .......... 186/61; 235/383, 385, 470, 472.01
See application file for complete search history.

(56) References Cited

U.S. PATENT DOCUMENTS

| | | | |
|---|---|---|---|
| 3,059,709 A | 10/1962 | Karp | 177/5 |
| 4,024,380 A | 5/1977 | Gunn | 235/61.9 |
| 4,071,740 A | 1/1978 | Gogulski | 235/431 |
| 4,435,767 A | 3/1984 | Nakatani et al. | 364/405 |
| 4,597,457 A | 7/1986 | Ikekita | 177/25 |
| 4,623,877 A | 11/1986 | Buckens | 340/572 |
| 4,638,312 A | 1/1987 | Quinn et al. | 340/825.35 |
| 4,656,344 A | 4/1987 | Mergenthaler et al. | 235/462 |
| 4,661,908 A | 4/1987 | Hamano et al. | |
| 4,676,343 A | 6/1987 | Humble et al. | |
| 4,693,329 A | 9/1987 | Hikita | 177/4 |
| 4,766,296 A | 8/1988 | Barth | 235/383 |
| 4,775,782 A | 10/1988 | Mergenthaler et al. | 235/146 |
| 4,775,935 A | 10/1988 | Yourick | 364/401 |
| 4,779,706 A | 10/1988 | Mergenthaler | 186/61 |

(Continued)

FOREIGN PATENT DOCUMENTS

EP 0 817 141 9/1997

(Continued)

OTHER PUBLICATIONS

P. Frank, "Advances in Supermarket Technology Intriguing and Pampering Customers", *The New York Times*, Jun. 10, 1987, p. D8.

(Continued)

*Primary Examiner*—Andrew Joseph Rudy
(74) *Attorney, Agent, or Firm*—Clifford Chance US LLP

(57) ABSTRACT

A self-checkout system includes a graphical user interface for self-checkout of non-bar-coded items. The interface displays a predetermined image corresponding to a non-bar-coded item, and means for the user to select the image. A product look up (PLU) entry device provides a PLU corresponding to the item selected by the user and a processing unit uses the selected PLU to retrieve price information from a database. The processing unit may also maintain a list of most frequently sold items and the image of at least on item on the list is provided on the display screen. The processing unit may update the display screen when the list of most requently sold items changes. Images of other non-bar-coded items can also be displayed.

10 Claims, 17 Drawing Sheets

U.S. PATENT DOCUMENTS

| | | | |
|---|---|---|---|
| 4,787,467 A | 11/1988 | Johnson | |
| 4,792,018 A | 12/1988 | Humble et al. | |
| 4,843,546 A | 6/1989 | Yoshida et al. | 364/403 |
| 4,862,401 A | 8/1989 | Kubli et al. | 364/710.07 |
| 4,866,661 A * | 9/1989 | de Prins | 235/382 |
| 4,879,650 A | 11/1989 | Kurimoto et al. | 364/405 |
| 4,882,724 A | 11/1989 | Vela et al. | 364/401 |
| 4,940,116 A | 7/1990 | O'Connor et al. | 186/61 |
| 4,964,053 A | 10/1990 | Humble | |
| 5,083,638 A | 1/1992 | Schneider | |
| 5,115,888 A * | 5/1992 | Schneider | 186/61 |
| 5,123,494 A | 6/1992 | Schneider | |
| 5,125,465 A | 6/1992 | Schneider | |
| 5,168,961 A | 12/1992 | Schneider | |
| 5,311,969 A | 5/1994 | Dickover et al. | 186/61 |
| 5,340,970 A | 8/1994 | Wolfe, Jr. et al. | 235/383 |
| 5,375,680 A * | 12/1994 | Ikeda et al. | 186/61 |
| 5,424,521 A | 6/1995 | Wolfe, Jr. et al. | 705/20 |
| 5,426,282 A * | 6/1995 | Humble | 235/383 |
| 5,494,136 A | 2/1996 | Humble | 186/61 |
| 5,497,314 A * | 3/1996 | Novak | 705/17 |
| 5,510,979 A | 4/1996 | Moderi et al. | 364/405 |
| 5,839,104 A | 11/1998 | Miller et al. | 704/251 |
| 5,992,570 A * | 11/1999 | Walter et al. | 186/36 |
| 6,092,725 A * | 7/2000 | Swartz et al. | 235/383 |
| 6,179,206 B1 * | 1/2001 | Matsumori | 235/383 |
| 6,314,406 B1 * | 11/2001 | O'Hagan et al. | 705/14 |
| 6,363,366 B1 * | 3/2002 | Henty | 705/400 |
| 6,409,085 B1 * | 6/2002 | Gu | 235/462.11 |
| 6,412,699 B1 * | 7/2002 | Russell et al. | 235/472.01 |
| 6,418,414 B1 | 7/2002 | Lutz et al. | 705/16 |
| 6,471,125 B1 * | 10/2002 | Addy | 235/385 |
| 6,484,939 B1 * | 11/2002 | Blaeuer | 235/383 |
| 6,540,143 B1 * | 4/2003 | Matsumori | 235/462.13 |
| 6,550,583 B1 * | 4/2003 | Brenhouse | 186/66 |
| 6,577,983 B1 * | 6/2003 | Zhu | 702/128 |
| 6,580,440 B1 * | 6/2003 | Wagner et al. | 345/762 |
| 6,595,417 B2 * | 7/2003 | O'Hagan et al. | 235/383 |
| 6,606,579 B1 * | 8/2003 | Gu | 702/181 |
| 6,693,236 B1 * | 2/2004 | Gould et al. | 84/477 R |
| 2002/0002485 A1 | 1/2002 | O'Brien et al. | 705/14 |

FOREIGN PATENT DOCUMENTS

| | | |
|---|---|---|
| GB | 2 217 887 | 4/1989 |

OTHER PUBLICATIONS

A. Bermar, "Competition, tight margins move grocers to automate", *PC Week*, Apr. 5, 1988, v5 n14 pC1(2).

M. O'Leary, "Labor shortage turns grocers to automation", *PC Week*, Jun. 11, 1988 v5 n28 pC17(1).

P.G. Hollie, "Shoppers check it out", *The New York Times*, Apr. 27, 1986, v135 s3, pF1(N) pF1(L), col 1 (3 col in).

Written Opinion for PCT/IB01/01716 dated Sep. 9, 2003.

* cited by examiner

THE BUTTON YOU HAVE SELECTED
IS A GENERIC CATEGORY
WITH A SUBMENU THAT HAS
ALREADY BEEN DEFINED

DO YOU WISH TO CHANGE
THIS BUTTON ANYWAYS?

YES            NO

GO BACK

ARE YOU SURE YOU WISH
REMOVE THIS BUTTON?

YES            NO

GO BACK

SELF-CHECKOUT METHOD AND APPARATUS INCLUDING GRAPHIC INTERFACE FOR NON-BAR CODED ITEMS

This application claims the benefit of Provisional Application No. 60/244,234, filed Oct. 30, 2000.

FIELD OF THE INVENTION

The present invention relates to a method and apparatus for self-checkout. In particular, the invention relates to a method of and apparatus for self-checkout of non-bar coded items which includes using a graphic user interface (GUI) on a touch screen display.

BACKGROUND OF THE INVENTION

In a traditional retail environment, a customer selects various items for purchase and brings these items to a store clerk for checkout. Over the past few decades, retail point of sale systems have been greatly automated to expedite the checkout process. Computer-based point-of-sale systems are now the norm in the retail environment.

Such point-of-sale systems include one or more terminals, and a database of prices, inventory and other information related to the items for purchase. Each terminal typically has an optical scanner which scans the items to be purchased for a machine readable bar code that identifies the item on its packaging. When an item is scanned, the optical scanner sends a signal corresponding to the product number of the item to a data processing component of the point-of-sale system, which then obtains from the database the price and the description of the scanned item.

More recently, self-checkout point-of-sale systems have been popularized. These systems typically comprise self-checkout terminals each of which typically is provided with a bar code scanner with an integrated scale that allows the customer to scan the bar codes on the items to be purchased. The terminal typically also has other input and output devices such as a printer, electronic fund transfer terminal (EFT), a video camera unit and a display.

Automated self-checkout systems, such as the U-Scan Express® available from Optimal Robotics Corp., have become popular among retailers throughout North America. Some self-checkout systems are described in U.S. Pat. Nos. 5,083,638, 5,115,888, 5,123,494, 5,125,465 and 5,168,961, which are incorporated herein by reference.

In the typical retail market, most produce items, as well as other items such as items priced according to weight but usually not having a standardized weight, do not have a Universal Product Code (UPC), in the form of a bar code, associated with them. A Product Look Up (PLU) code is assigned instead to such items. The PLU code corresponds to a numeric identification of the item and, in most cases, is attached to the item with a sticker.

The non-bar coded item typically is checked out by the item being placed on the scale at the checkout station, if the item is priced according to weight, and then the PLU code of the item being entered by the customer at the self-checkout station, or by the cashier at a manned checkout station, using the numeric keypad. The processing unit then assigns a price to the item based on the PLU code and, if applicable, the weight of the item detected by the scale. Many customers at such self-checkout stations do not know, however, that they need to enter manually the PLU code for such items, and therefore such customers experience delay in the checkout process.

At a self-checkout terminal, the customer is provided means to call for assistance from a supervisory employee when a non-bar coded item is to be processed. The video camera unit at the self-checkout terminal captures a video image of the uncoded item placed on the terminal's scale by the customer. The video image of the uncoded item is displayed at a supervisor station display which allows the supervisory employee to view the non-bar coded item and thereafter enter the appropriate PLU code for the item. This employee typically supervises, however, several self-checkout terminals, and therefore the customer might encounter delay waiting for a non-bar coded item to be processed.

SUMMARY OF THE INVENTION

The present invention provides an apparatus and method for self-checkout of non-bar coded items. The apparatus includes a PLU entry device, a PLU database and a processing unit. The PLU entry device includes a display and a GUI. The GUI provides on the display a predetermined image corresponding to a non-bar coded item, and means for the user to select the predetermined image of the non-bar coded item. The PLU entry device supplies a PLU corresponding to the non-bar coded item selected by the user. The processing unit uses the PLU supplied by the PLU entry device to retrieve the price of the selected non-bar coded item from the PLU database.

The apparatus may include a GUI editor. The GUI editor may be used to configure the GUI for non-bar coded items.

The processing unit may maintain for each item a count of the number of units of the item sold within a predetermined period of time. The processing unit also may maintain a list of most frequently sold items, and the image of at least one item on the list may be provided on a selected display screen. The processing unit may update the display screen when the list of most frequently sold items changes.

An image of a generic category of items may be provided on the display. The displayed image of the generic category may be selected by the user to view images of respective items in the generic category.

BRIEF DESCRIPTION OF THE DRAWINGS

The present invention can be more readily understood from the following detailed description by referring to the accompanying drawings wherein.

DETAILED DESCRIPTION OF THE INVENTION

A GUI for processing the purchase of non-bar coded (primarily produce) items at a self-checkout terminal is provided in accordance with one embodiment of the present invention. A GUI editor for setting up the GUI for non-bar coded items also may be provided.

Hereinafter, reference will be made to the processing of produce items for illustration purposes. However, as it will be apparent to one skilled in the art, the GUI also may be provided for the processing of other non-bar coded items. Images and PLU codes for other non-bar coded items, such as bakery and bulk items, can also be stored in a database of the processing unit.

Figure 30:
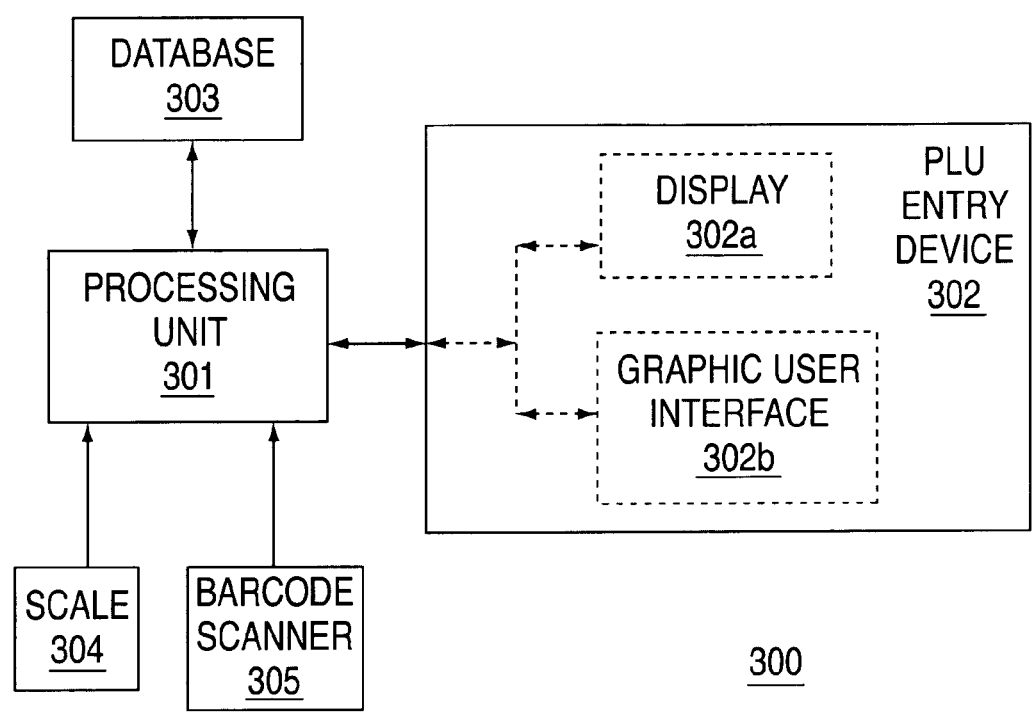
FIG. 30 shows a block diagram of an apparatus for self-checkout of non-bar coded items.

FIG. 30 shows a block diagram of an apparatus for self-checkout of non-bar coded items, in accordance with an embodiment of the present invention. Self-checkout apparatus 300 includes a processing unit 301 which may be configured similar to known microprocessor-based computers and has a central processing unit (CPU), a plurality of storage devices, an input/output (I/O) interface and a network interface. The storage devices may include program memory, random access memory (RAM), non-volatile memory [such as read-only memory (ROM), electrically erasable programmable ROM (EEPROM), etc.], and any or a combination of the mass storage devices known conventionally in the art, such as floppy disk, optical disk, hard disk and/or tape cartridge drives, plus appropriate device, drivers. The CPU communicates via the I/O interface with a PLU database 303, one or more scales 304, PLU entry device 302, and a bar code scanner, as well as with other input devices and output devices.

Processing unit 301 communicates via the network interface with devices, such as a host station, on a network which may be any one or a combination of local area network (LAN), wide area network (WAN), wireless and other networks. The network interface includes the appropriate units for interfacing with the network, including, for example, Ethernet card, modem, radio frequency (RF) transceiver, etc. For example, processing unit 301 may download product and other information from a central point-of-sale database on the network, on power-up as well as periodically during operation, via the network interface. Thus, the PLU database stored in the storage devices may be updated.

PLU entry device 302 includes display 302a and GUI 302b, and may be used by the customer to enter the PLU of an item that does not have a bar code. For example, when a shopper at the self-checkout terminal places an item on scale 304, a GUI screen shown in for example FIG. 1 by default is displayed on the display. The GUI provides the customer with directions to guide him/her along to specify the item that is on the scale. The images of a number of pre-selected non-bar coded items and/or generic categories are displayed. Since verbal instructions as well as graphic content are provided, the customer is easily able to identify the product that is on the scale. Display 302a preferably is a touch screen display. Other displays coupled with a pointer device may also be used.

After the customer has specified, using the GUI, the item that is on the scale, the processing unit 301 uses a PLU associated with the specified item to retrieve a price of the item from the PLU database.

In accordance with one embodiment of the present invention, the GUI for processing of non-bar coded (as well as other) items is provided on a touch screen display of a self-checkout terminal. The GUI for the processing of non-bar coded items, such as produce items, may display photo quality images of the non-bar coded items on the touch screen monitor. The customer typically places the non-bar coded item on a scale at the terminal and then selects the image of the non-bar coded item displayed by the GUI on the touch screen monitor. The scale may be integrated with a bar code scanner such that the integrated device provides the functions of a scanner as well as a scale. A processing unit of the self-checkout terminal automatically assigns a price to the item based on the PLU code of the item and its detected weight.

A graphic numeric "keypad" also may be provided (as a touch screen zone) on the touch screen monitor. The numeric keypad on the touch screen monitor allows the customer to enter the PLU code once the non-bar coded item has been placed on the scale. The processing unit assigns a price to the item according to the PLU code entered and the weight of the item detected by the scale.

A number of categories of images may be displayed on the screen. One category which may be generated by the processing unit corresponds to a list of produce items sold most frequently at the self-checkout terminals. Another category of images corresponds to specific produce items, such as a specific fruit or vegetable (e.g., kiwi, red pepper). Yet another group of images may correspond to generic produce categories, such as a family of fruits or vegetables (e.g., citrus, pears, stone fruit or beans). Lemons and limes, for example, may be represented by the generic citrus category.

Figure 1:
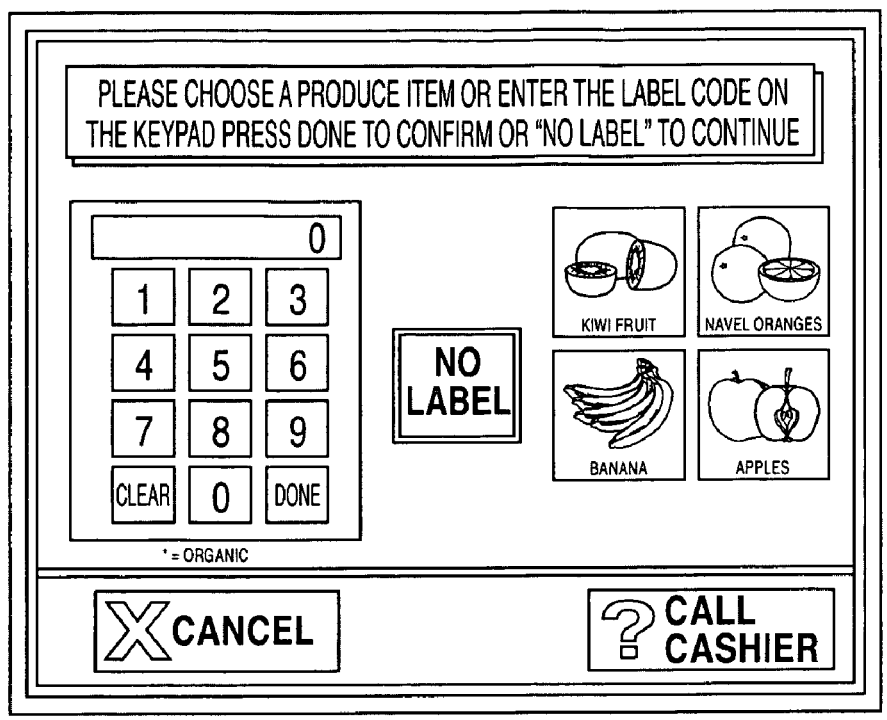
FIG. 1 shows an exemplary image in a GUI for non-bar coded items, in accordance with one embodiment of the present invention, that might appear on a touch screen monitor for selecting a generic category of items.
Figure 2:
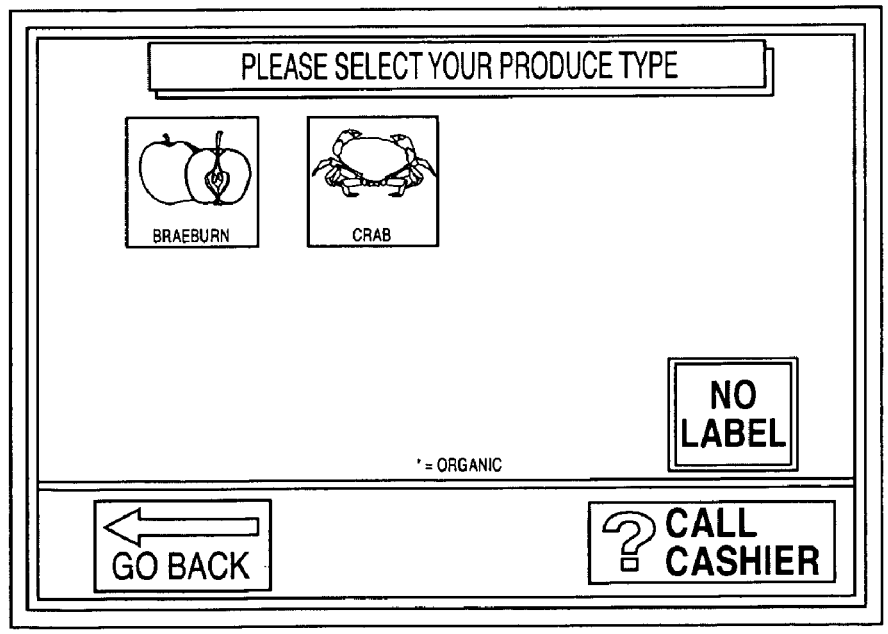
FIG. 2 shows an exemplary GUI screen for selecting one of specific types of apples.

The image shown in FIG. 1 illustrates an example of a screen that might appear on the touch screen monitor in a GUI for non-bar coded items. After the user selects a button corresponding to the generic apples category from a GUI screen, shown for example in FIG. 1, the GUI then may provide a second screen which includes buttons corresponding to specific types of apples, such as illustrated in FIG. 2.

In addition, a button (e.g., identified in FIG. 1 as "No Label") may be provided on the display for selection by the customer when no PLU code sticker is present on the produce item, or when no image of the produce item is displayed on the touch screen monitor.

A database of specific produce (or non-bar coded) item images and their associated PLU codes may be stored on the hard disk of the processing unit. A database of generic produce (or non-bar coded) category images also may be stored on the hard disk of the processing unit. A database system may be in place in the processing unit to dynamically maintain a list of the most frequently sold items at each self-checkout terminal in the store.

The images of the most frequently sold items, corresponding to information stored in the most frequently sold items database, are displayed on the touch screen monitor. The list of the most frequently sold items may change continuously as a result of ongoing sales at the self-checkout terminals. The system automatically updates the images on the touch screen monitor for those buttons pre-defined as buttons for most frequently sold items. The updating of the buttons may be dynamic and occur in between the processing of two orders at the self-checkout terminal.

The processing unit of each self-checkout terminal may maintain an item count of every produce (or non-bar coded item) sold. Checkout terminals may communicate to find the highest count of produce (or non-bar coded) items in their database. The produce (or non-bar coded) items with the highest count overall may be displayed on the touch screens of the self-checkout terminals.

As an example, the following may be a snapshot (in time) of information stored in the databases corresponding to counts of produce (or non-bar coded) items sold at four respective self-checkout terminals in a grocery store:

| Terminal 1 Database | Terminal 2 Database | Terminal 3 Database | Terminal 4 Database |
| --- | --- | --- | --- |
| carrots = 156 | lemons = 200 | bananas = 750 | cucumbers = 6 |
| peaches = 48 | tomatoes = 156 | carrots = 155 | bananas = 46 |

After the terminals have communicated amongst themselves, the following results may be displayed on the touch screen monitor of each of the self-checkout terminals:

| | |
| --- | --- |
| Top 1 = bananas | Top 4 = tomatoes |
| Top 2 = carrots | Top 5 = peaches |
| Top 3 = lemons | Top 6 = cucumbers |

An editor for setting up the non-bar coded items GUI, in accordance with one embodiment of the present invention, will be described below in connection with FIGS. 3-26 and 29.

A GUI editor may be provided as a tool for an administrator of the self-checkout system to set up the GUI for non-bar coded items. The term "administrator" is used herein to mean a person who has access privileges for configuring the GUI for non-bar coded items. Such person need not be a computer specialist or expert, particularly when the person has the benefit of a GUI editor such as the one described below.

Using the GUI editor, the administrator may select, and configure the terminals to show, the appropriate GUI screens, such as those illustrated in FIGS. 1 and 2, for non-bar coded items.

Configuration of the GUI for non-bar coded items may be performed at, for example, one of the self-checkout terminals in a maintenance mode. The maintenance mode screens at the self-checkout terminal allow the administrator to use a GUI editor for setting up the screens for processing non-bar coded items. After configuration of the GUI for non-bar coded items has been completed at the selected terminal, the GUI data may be broadcast to the remaining self-checkout terminals in the store on a LAN or wireless network, in order for the GUI for non-bar coded items to be installed on those terminals.

The selected checkout terminal on which the GUI for non-bar coded items will be configured enters a maintenance mode from one of a number of possible paths. For example, the terminal may enter the maintenance mode by default upon boot-up or by command from a shell or user interface.

Figure 3:
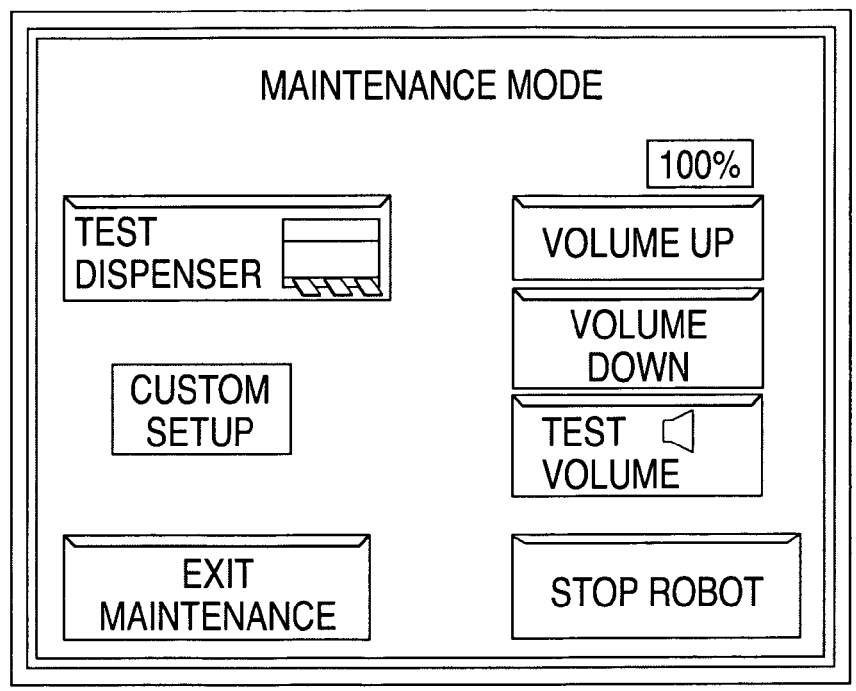
FIG. 3 shows an exemplary GUI screen presenting maintenance mode options.

An example of a GUI screen which may be displayed when the terminal enters the maintenance mode is illustrated in FIG. 3. The maintenance mode screen provides assorted user interface features for performing maintenance at the terminal, including testing the various components of the terminal, such as the bill dispenser and the speaker. Moreover, the administrator is provided with means, e.g., a graphic button/key, to enter custom setup of the terminal (step 102 shown in FIG. 29).

Figure 4:
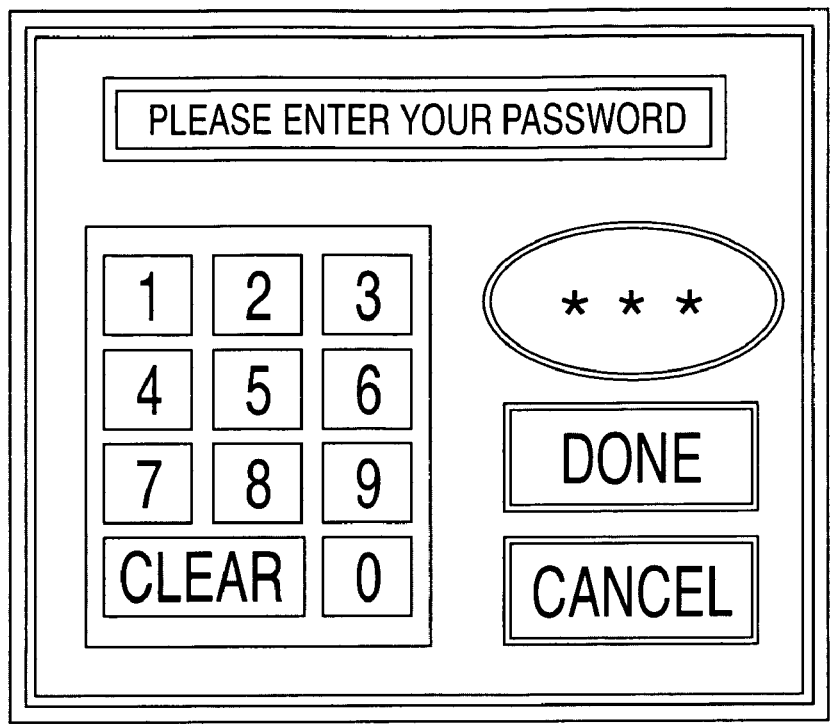
FIG. 4 shows an exemplary GUI screen for entering a password.
Figure 5:
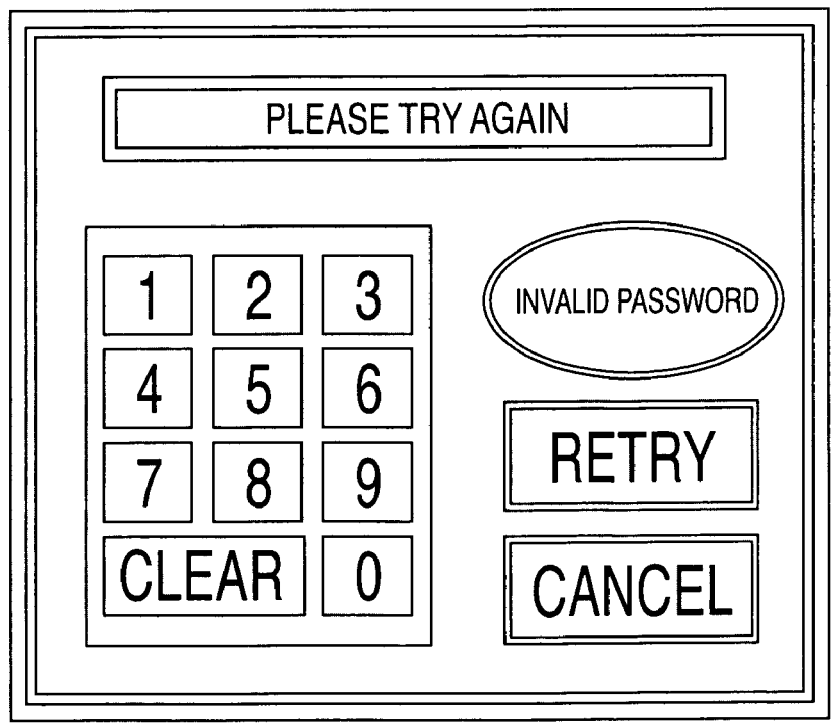
FIG. 5 shows an exemplary GUI screen for entering an alternate password.
Figure 6:
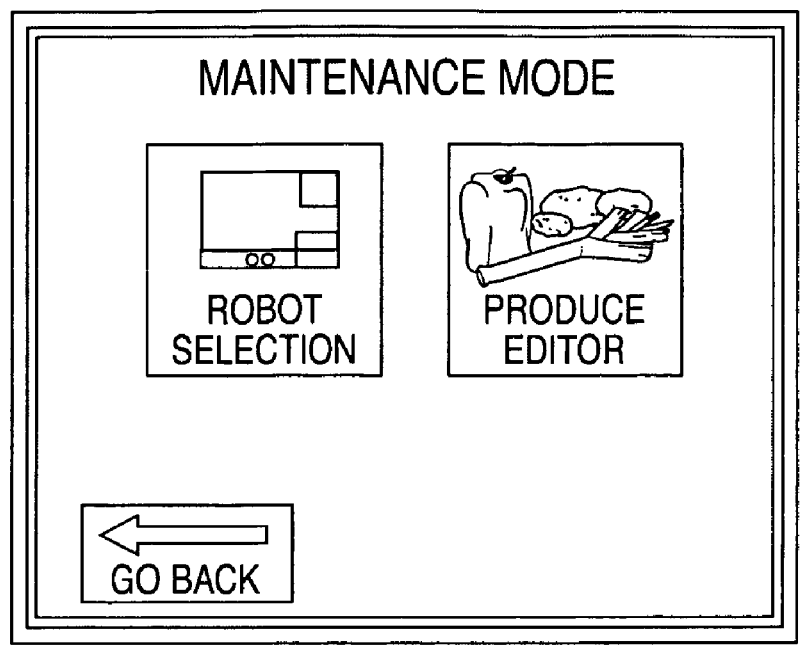
FIG. 6 shows an exemplary GUI screen presenting custom setup options.

Custom setup is password protected, i.e., the user is required to enter a password to enter custom setup. An example of a GUI screen for entering custom setup is illustrated in FIG. 4. The user may enter the password and select a "DONE" button on the touch screen monitor (step 104). If the password is incorrect (step 106), a message asking the user to try again may appear on the screen, as shown for example in FIG. 5.

When the password is correct, the administrator is provided with a number of custom setup functions by the GUI. The user interface provides means on the touch screen monitor, e.g., button identified as "Produce Editor" in FIG. 6, for the user to select access to the GUI editor for non-bar coded items (step 108). An additional password also may be required for access to the GUI editor. The GUI again may prompt the user for a password as shown for example in FIG. 4 (step 110).

Figure 7:
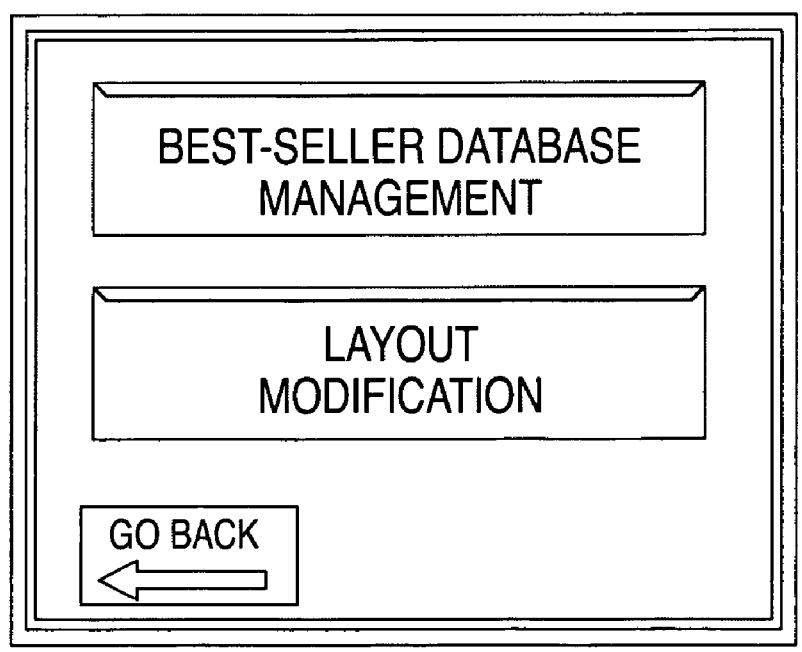
FIG. 7 shows an exemplary GUI editor screen presenting edit options.

After a correct password is supplied (step 112), the GUI editor provides the administrator with two edit options (step 114), as shown for example in FIG. 7. The administrator may select the first option (shown in FIG. 7 as "Best-Seller Database Management") to configure a database of specific features, such as the best seller items, described further below. The administrator may select the second option (shown in FIG. 7 as "Layout Modification") to configure a layout of the GUI for non-bar coded items.

Figure 8:
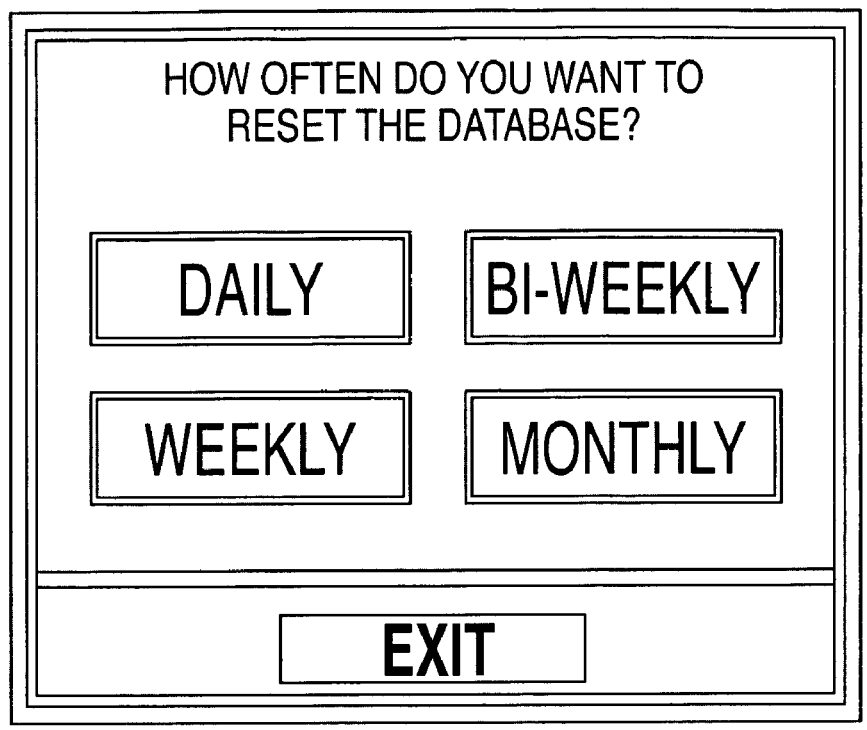
FIG. 8 shows an exemplary GUI editor screen for selecting a reset frequency for the database of most frequently sold items.
Figure 9:
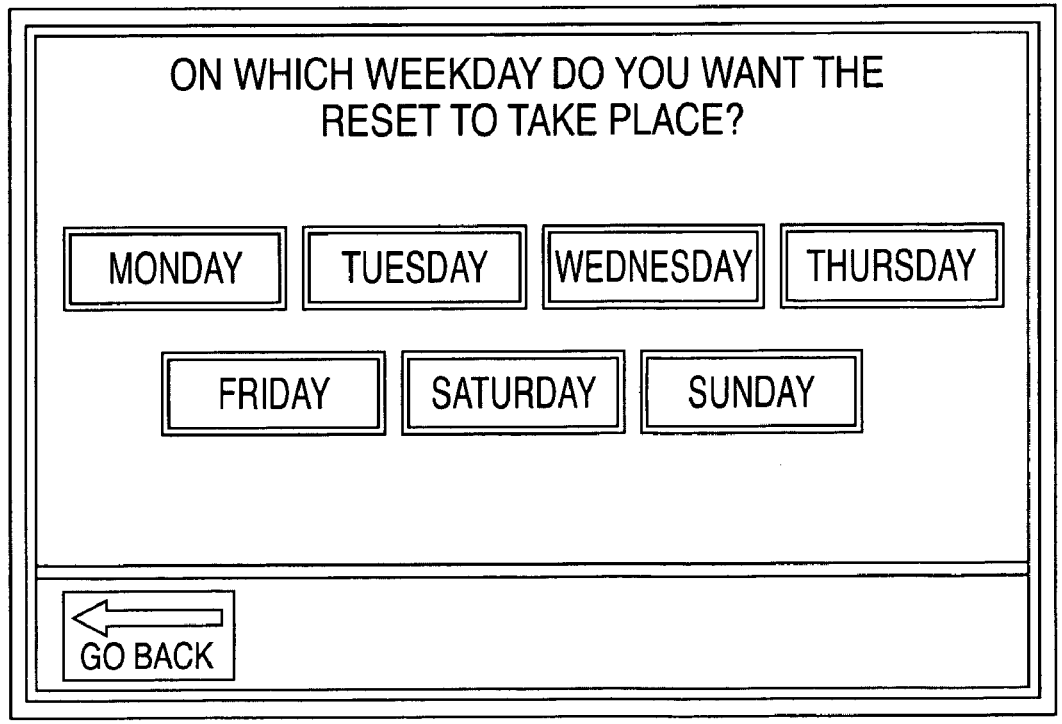
FIG. 9 shows an exemplary GUI editor screen for selecting a day of the week upon which the database is to be reset.
Figure 10:
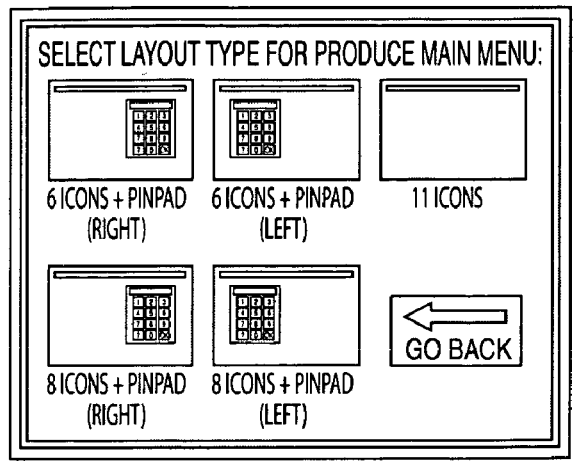
FIG. 10 shows an exemplary GUI editor screen for selecting visual layout of the GUI for non-bar coded items.

When the administrator selects the first option, the GUI editor prompts the administrator to select a frequency for resetting the database of the most frequently sold items (step 116), as shown for example in FIG. 8. The frequencies that may be selected include, for example, daily, weekly, bi-weekly, monthly, etc. After the administrator selects the update frequency, the GUI editor prompts the administrator to select a day of the week on which the database is to be reset (step 118), as shown for example in FIG. 9.

After the administrator completes configuration of the best-seller database, the GUI editor provides the administrator with the edit options again (FIG. 7). The administrator then may select the "Layout Modification" option. A number of possible visual layouts of the GUI for non-bar coded items are displayed by the GUI editor for selection (step 120), as shown for example in FIG. 10.

Figure 11:
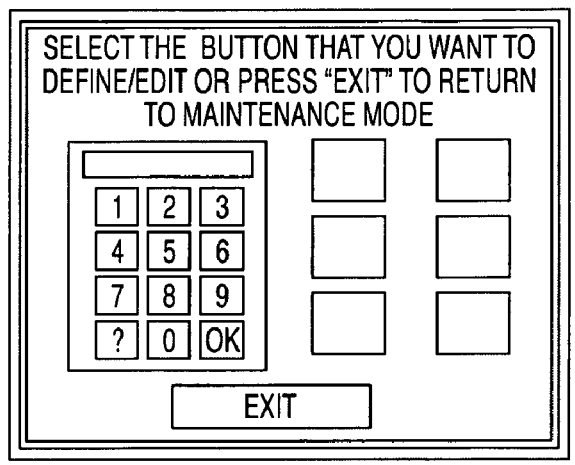
FIG. 11 shows an exemplary GUI editor screen for selecting a button to which an item or generic category may be assigned.

After one of the layouts is selected, the GUI editor prompts the administrator to select one of the buttons to be defined in the GUI for non-bar coded items (step 122), as shown for example in FIG. 11. Next, the GUI editor prompts the administrator to assign the selected button to an item or generic category (step 124). As shown for example in FIG. 12, the button may be assigned to one of the following item/category types: (i) a best seller; (ii) a specific produce item, e.g. kiwi; or (iii) a generic produce category, e.g., a family of fruits or vegetables.

For example, if "A Top 12 Best-seller Item" is selected (step 126), the selected button is assigned dynamically to the item that is currently highest in the list of most frequently sold produce items at the self-checkout terminals (step 128). After the button is assigned to the best seller item, the GUI editor prompts the administrator to select one of the remaining buttons, and the process is repeated for that second selected button.

Figure 12:
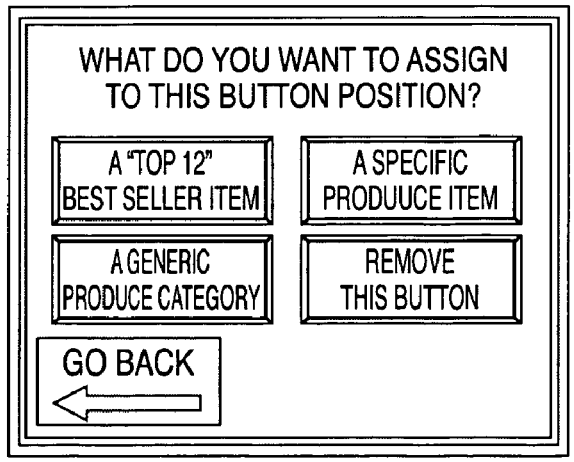
FIG. 12 shows an exemplary GUI editor screen for selecting a type of an item to be assigned to the selected button.
Figure 13:
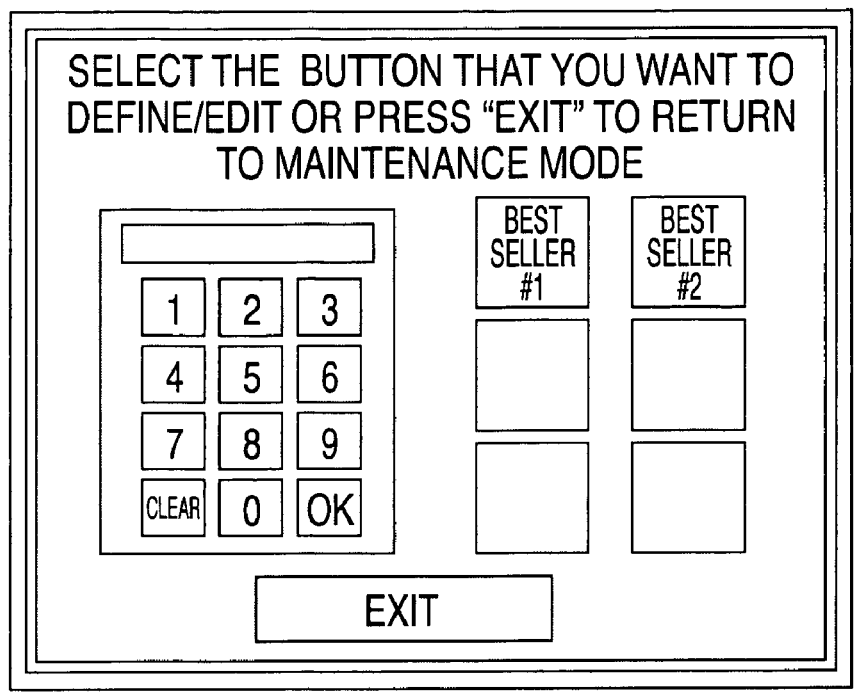
FIG. 13 shows an exemplary GUI editor screen for selecting a third button to be defined.
Figure 14:
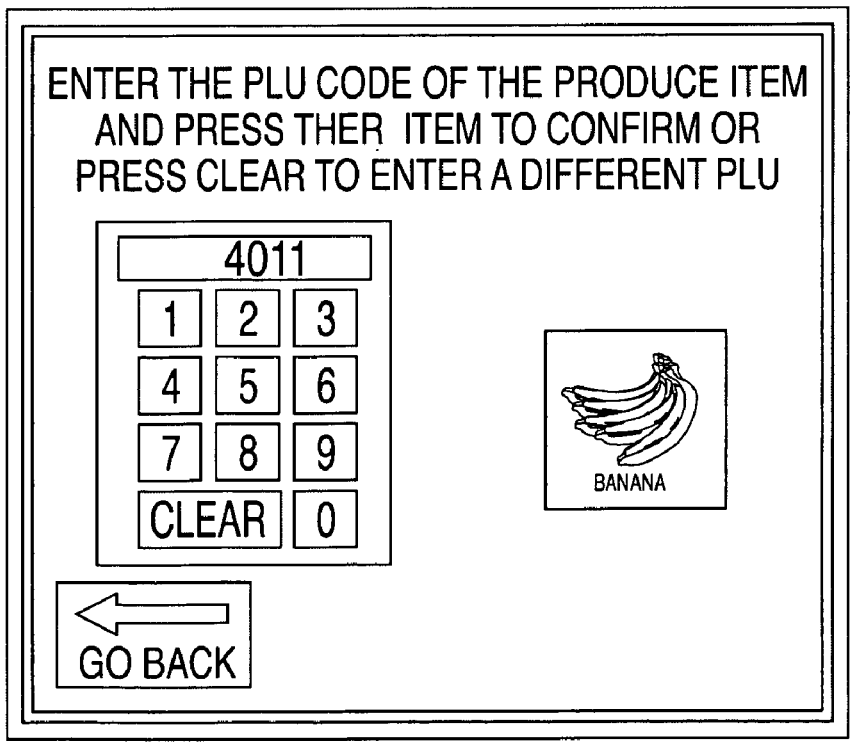
FIG. 14 shows an exemplary GUI editor screen for selecting a specific item to assign to a button.
Figure 15:
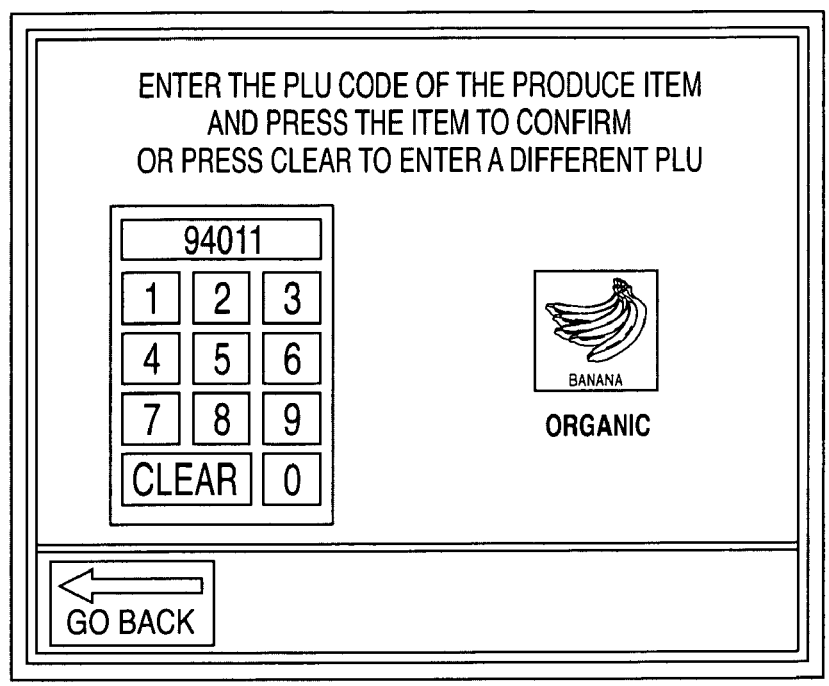
FIG. 15 shows an exemplary GUI editor screen indicating selection of an organic fruit/vegetable.
Figure 16:
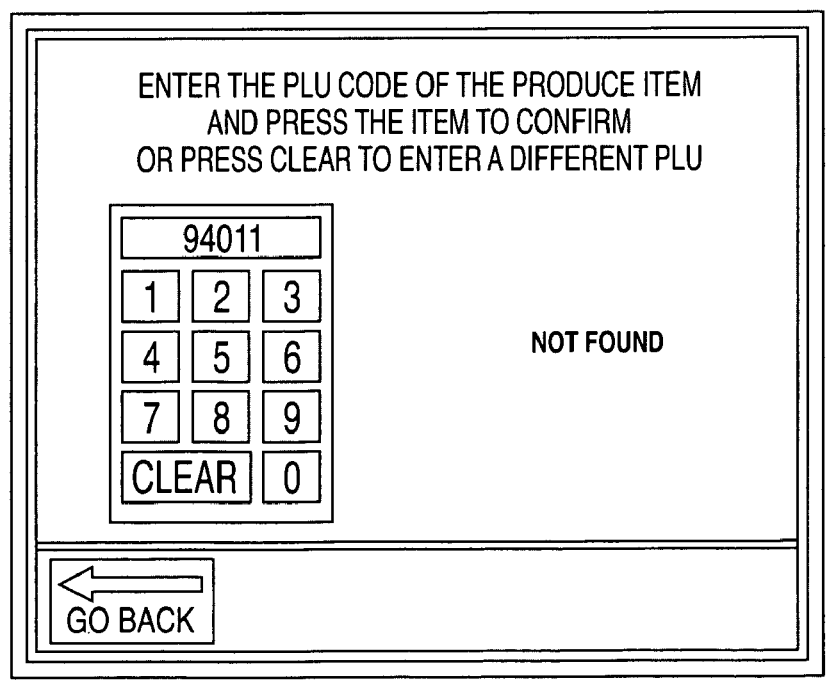
FIG. 16 shows an exemplary GUI editor screen informing that an incorrect PLU code was entered.

FIG. 13 shows a GUI editor screen prompting the administrator to select another one of the buttons after the second button is assigned to, for example, the next best seller. After the third button is selected, the GUI editor prompts the administrator to assign the selected button to a produce item or generic category, as shown for example in FIG. 12.

For example, if "A Specific Produce Item" is selected (step 130), the administrator is prompted to enter a PLU code of the item to be assigned to the selected button (step 132). The image corresponding to the entered PLU code appears in a portion of the GUI editor screen, as shown for example by the image of the banana in FIG. 14. As shown for example in FIG. 15, an organic fruit or vegetables can be selected by specifying its corresponding PLU code.

The administrator may confirm that the image that appears in the GUI editor screen should be assigned to the button by pressing the displayed image (steps 134, 136 and 137). On the other hand, if the wrong code was entered (step 134), the administrator may select "CLEAR" to enter the PLU code again (step 138). If the PLU code entered by the administrator is not valid (step 135), the GUI editor displays a message that the image is not on file, as shown for example in FIG. 16, and disables the "OK" button. Under this circumstance, the GUI editor waits for the "CLEAR" key to be selected and a valid PLU code to be entered.

Figure 17:
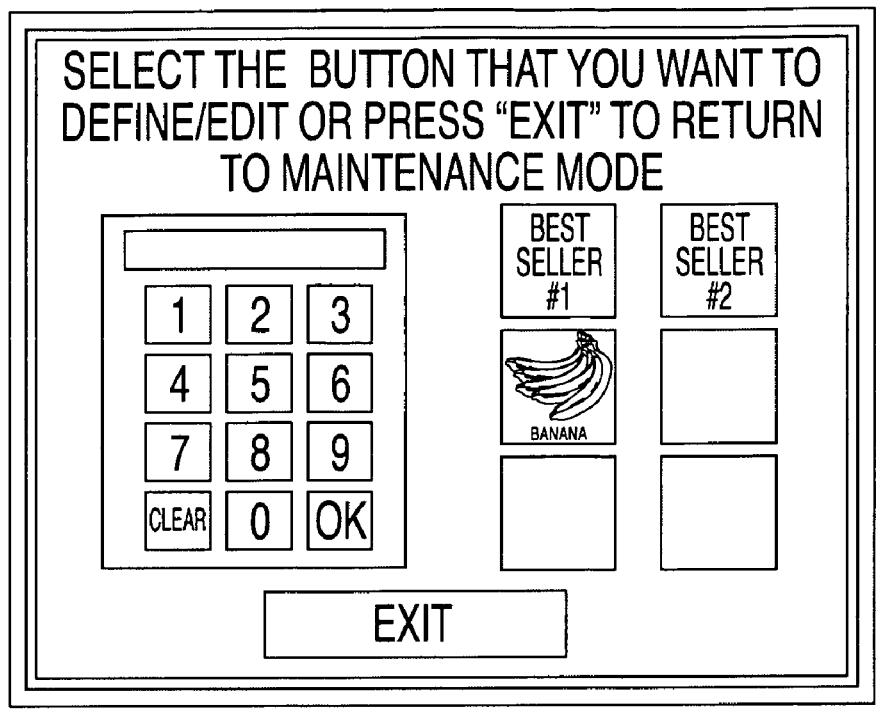
FIG. 17 shows an exemplary GUI editor screen for selecting a fourth button to be defined.
Figure 18:
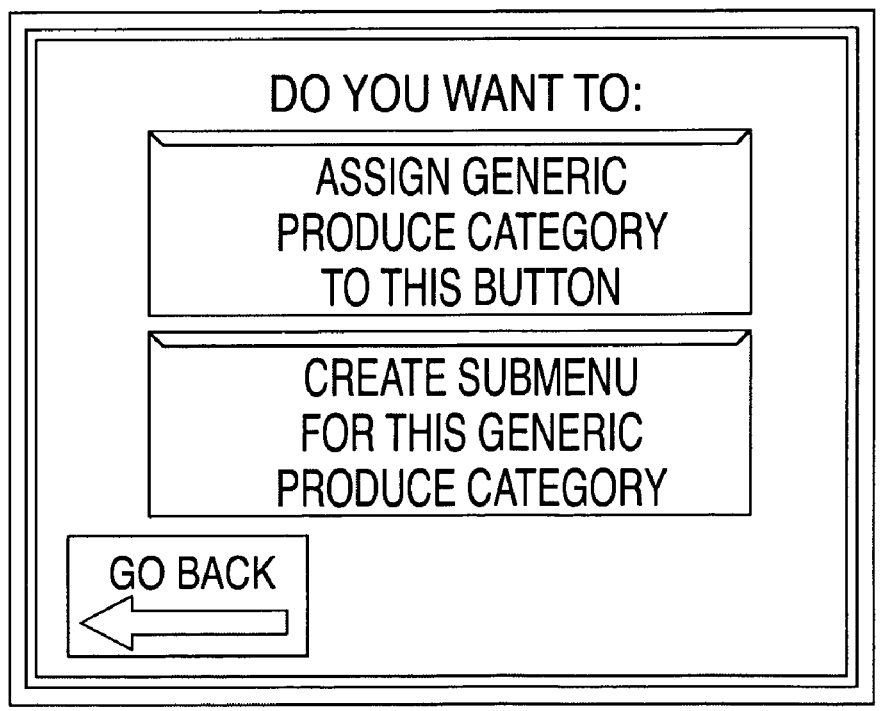
FIG. 18 shows an exemplary GUI editor screen for selecting a generic category to be assigned to a selected button.
Figure 19:
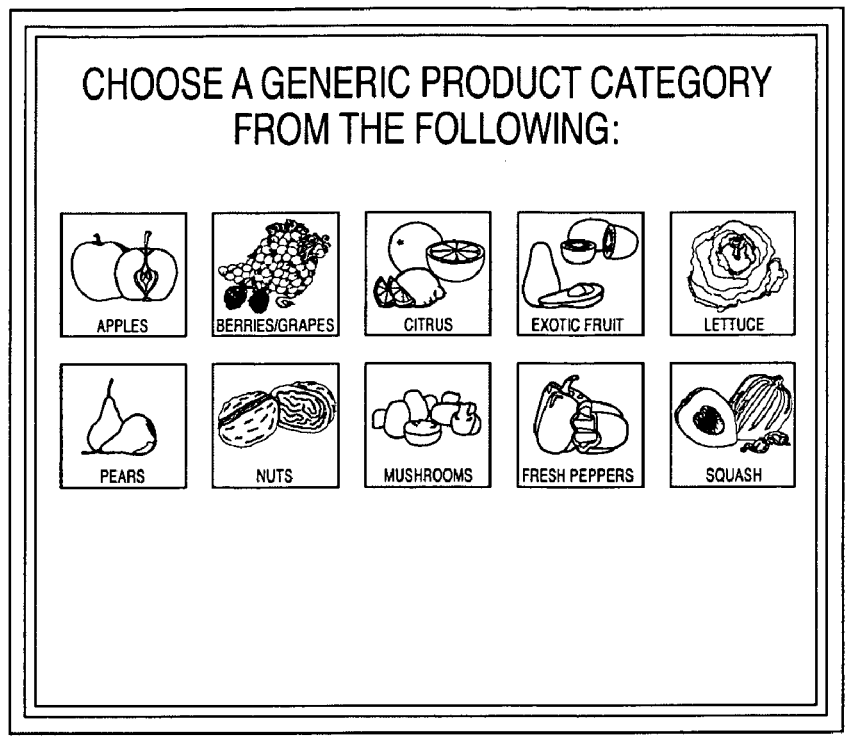
FIG. 19 shows an exemplary GUI editor screen for selecting a generic category.

Next, a fourth button to be defined may be selected from the main screen, as shown for example in FIG. 17. After a fourth button is selected, the screen for selecting an item or generic category, as shown for example in FIG. 12, again is presented by the GUI editor.

For example, "A Generic Produce Category" button may be selected (step 140). The generic category options include, as shown for example in FIG. 18, assigning a generic category to the selected button, or creating a submenu of other buttons to be linked to the category button. If the administrator chooses to assign the button to a generic category (step 141), the GUI editor prompts the administrator to select one of a number of generic categories (e.g., Apples) displayed on the screen (step 142), as shown for example in FIG. 19. When the administrator selects one of the generic categories, the selected button is set to the selected category (step 144).

Figure 20:
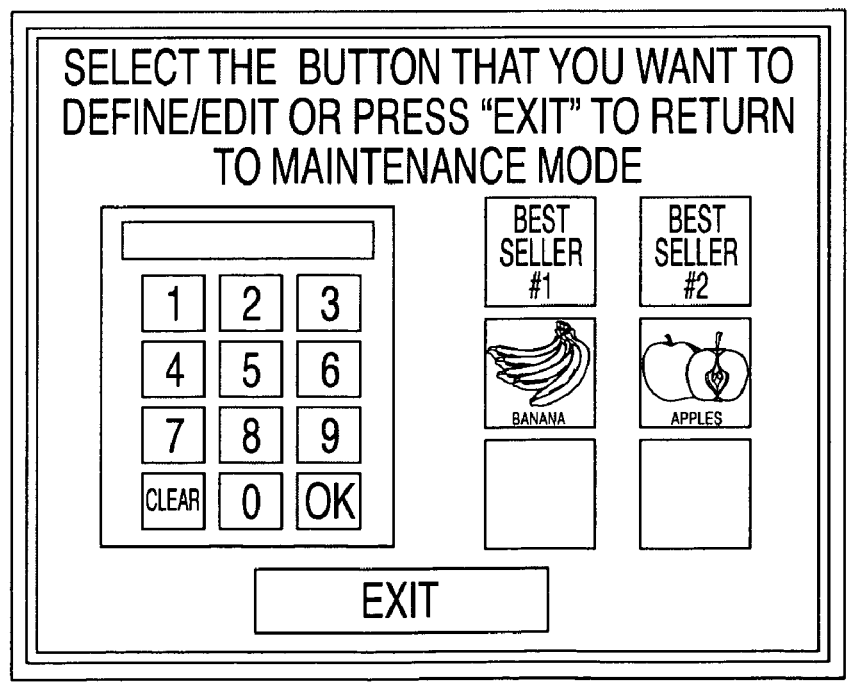
FIG. 20 shows an exemplary GUI editor screen for selecting a fifth button to be defined.
Figure 21:
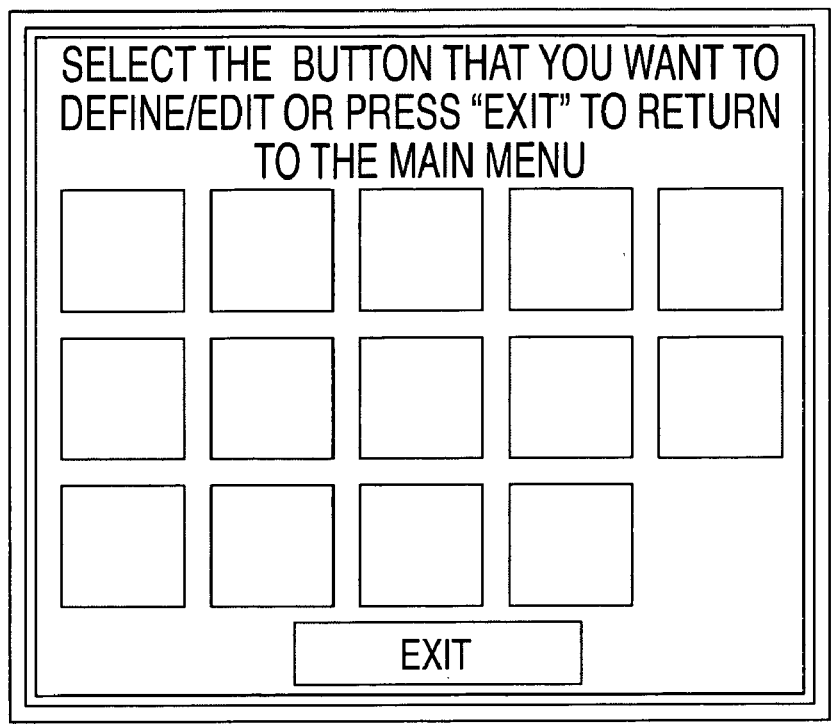
FIG. 21 shows an exemplary GUI editor screen for selecting a button to be assigned in the submenu.

Next, the GUI editor prompts the administrator to select a fifth button to be defined, as shown for example in FIG. 20. After a fifth button is selected, the GUI editor prompts the administrator to select an item or generic category to the selected button, as shown for example in FIG. 12. For example, this button, like the previous, may be assigned to a generic category. Then, the GUI editor prompts the administrator to either (i) assign a generic category to the button or (ii) create a submenu of other buttons to be linked to the button, as shown for example in FIG. 18.

The option to create a submenu for this button may be selected, and then specific items may be assigned to buttons in the submenu. If the option to create a submenu is selected (step 141), the GUI editor prompts the administrator to select a button in the submenu (step 146), as shown for example in FIG. 21. Next, the GUI editor prompts the administrator to enter a PLU code of the item to be assigned to the selected button (step 148). When the PLU code is entered, the image corresponding to the entered PLU code appears in a portion of the GUI editor screen, as shown for example in FIG. 22. The administrator may confirm that the image that appears in the GUI editor screen should be assigned to the button in the submenu, by pressing the displayed image (step 150). The selected button in the submenu then is set to the selected item corresponding to the entered PLU code (step 151). If a mistake is made (step 149), the "CLEAR" button may be selected (step 152) and a correct PLU code entered (step 148).

Figure 24:
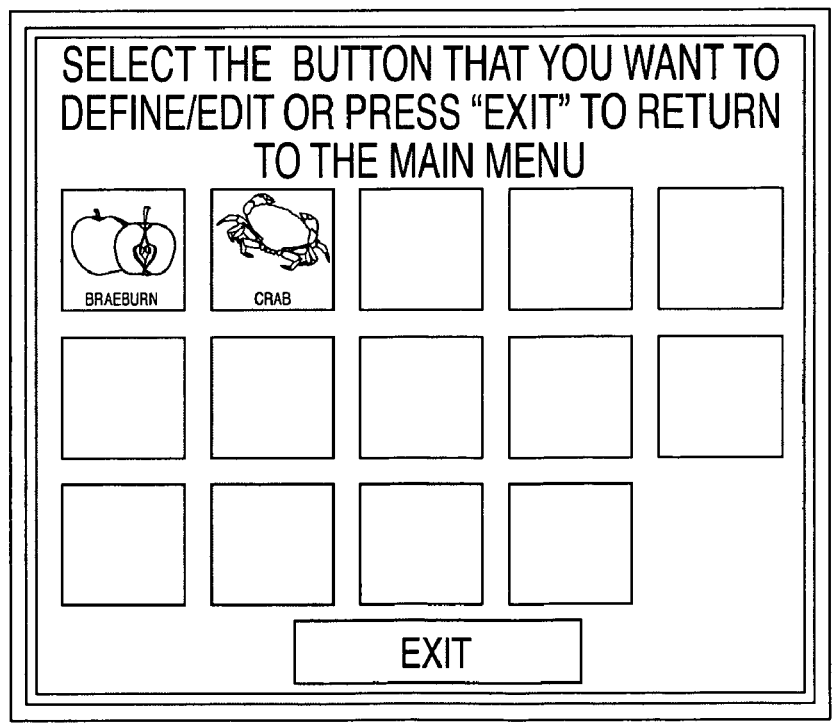
FIG. 24 shows an exemplary GUI editor screen for selecting a third button to be assigned in the submenu.
Figure 22:
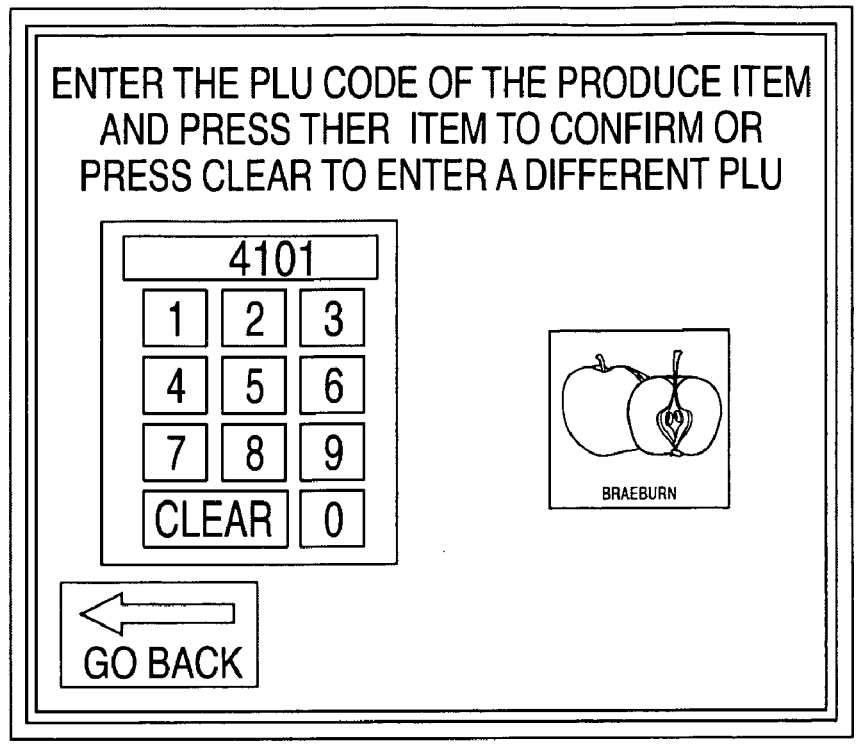
FIG. 22 shows an exemplary GUI editor screen for selecting an item to assign to the selected button in the submenu.
Figure 23:
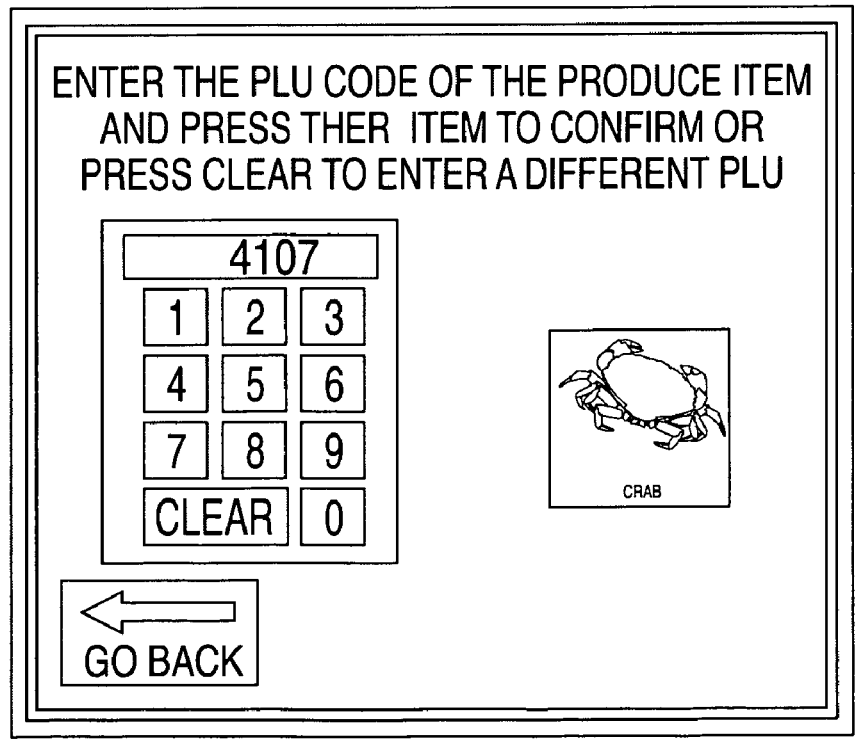
FIG. 23 shows an exemplary GUI editor screen for selecting an item to assign to a second button in the submenu.
Figure 25:
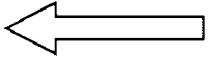
FIG. 25 shows an exemplary GUI editor screen for presenting a warning if a selected button has been assigned to a generic category with a pre-defined submenu.
Figure 26:
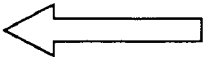
FIG. 26 shows an exemplary GUI editor screen for confirming removal of a selected button.

This process may be repeated, as shown for example in FIGS. 23 and 24, until all buttons in the submenu have been assigned to items. The "EXIT" button may be selected when the process is complete.

Let's now return to the GUI editor screen shown in FIG. 20. One of the already assigned buttons may be selected. After one of the assigned buttons (e.g., button assigned to the "Apples" category) is selected, the GUI editor screen shown in FIG. 12 is presented. If the administrator attempts to assign the button to another item or category, a warning screen, as shown for example in FIG. 25, appears. If the already assigned button corresponds to a generic category with a pre-defined submenu, all the information stored concerning the submenu could be lost if the "YES" button is selected.

Let's return again to the GUI editor screen shown in FIG. 20. After one of the assigned buttons is selected, the GUI editor screen shown in FIG. 12 again is presented. The administrator may choose to "Remove this Button" to delete the selected button. If the administrator chooses to "Remove this Button" a confirmation screen appears, as shown for example in FIG. 26. The "YES" button may be selected to confirm the deletion. The "Go Back" button may be selected to return to the edit options screen (i.e., FIG. 7), and then the "Go Back" button may be selected again to exit the GUI editor and return to the custom setup screen (i.e., FIG. 6), and a third time to return to the maintenance mode screen (i.e., FIG. 3).

Figure 27:
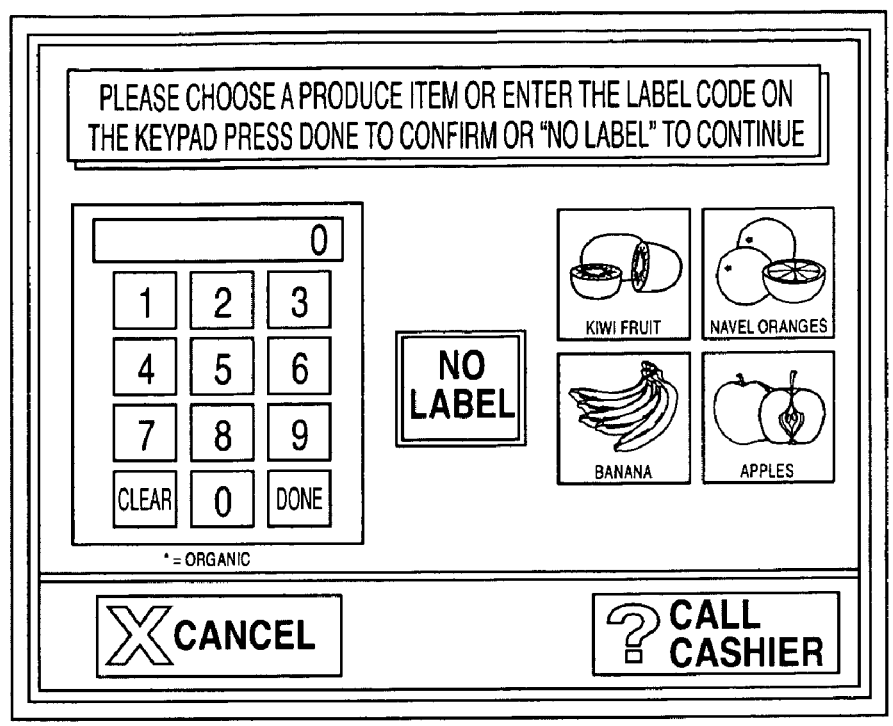
FIG. 27 shows an exemplary screen in the GUI for non-bar coded items.
Figure 28:
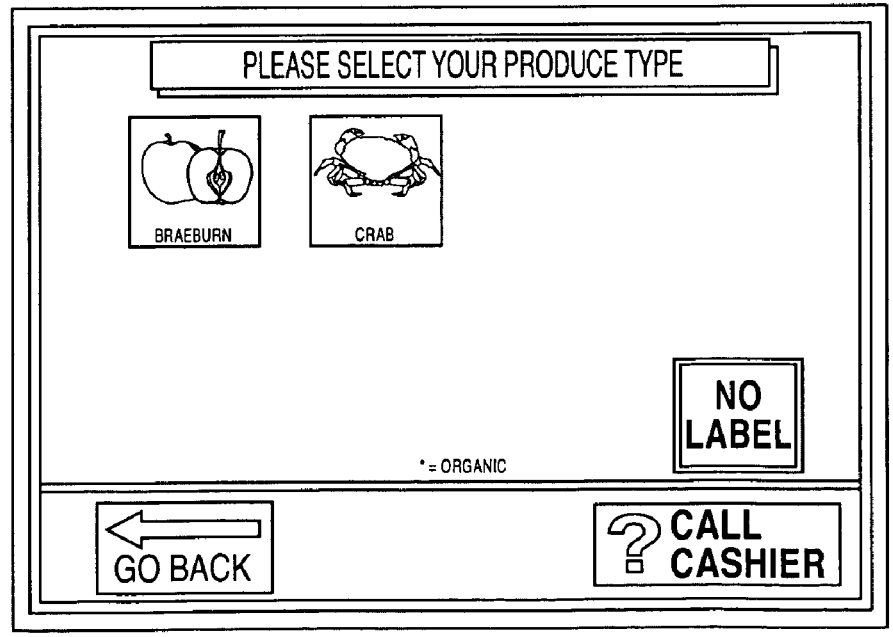
FIG. 28 shows an exemplary screen in the GUI for non-bar coded items when a generic category button is selected.
Figures 29, 29A:
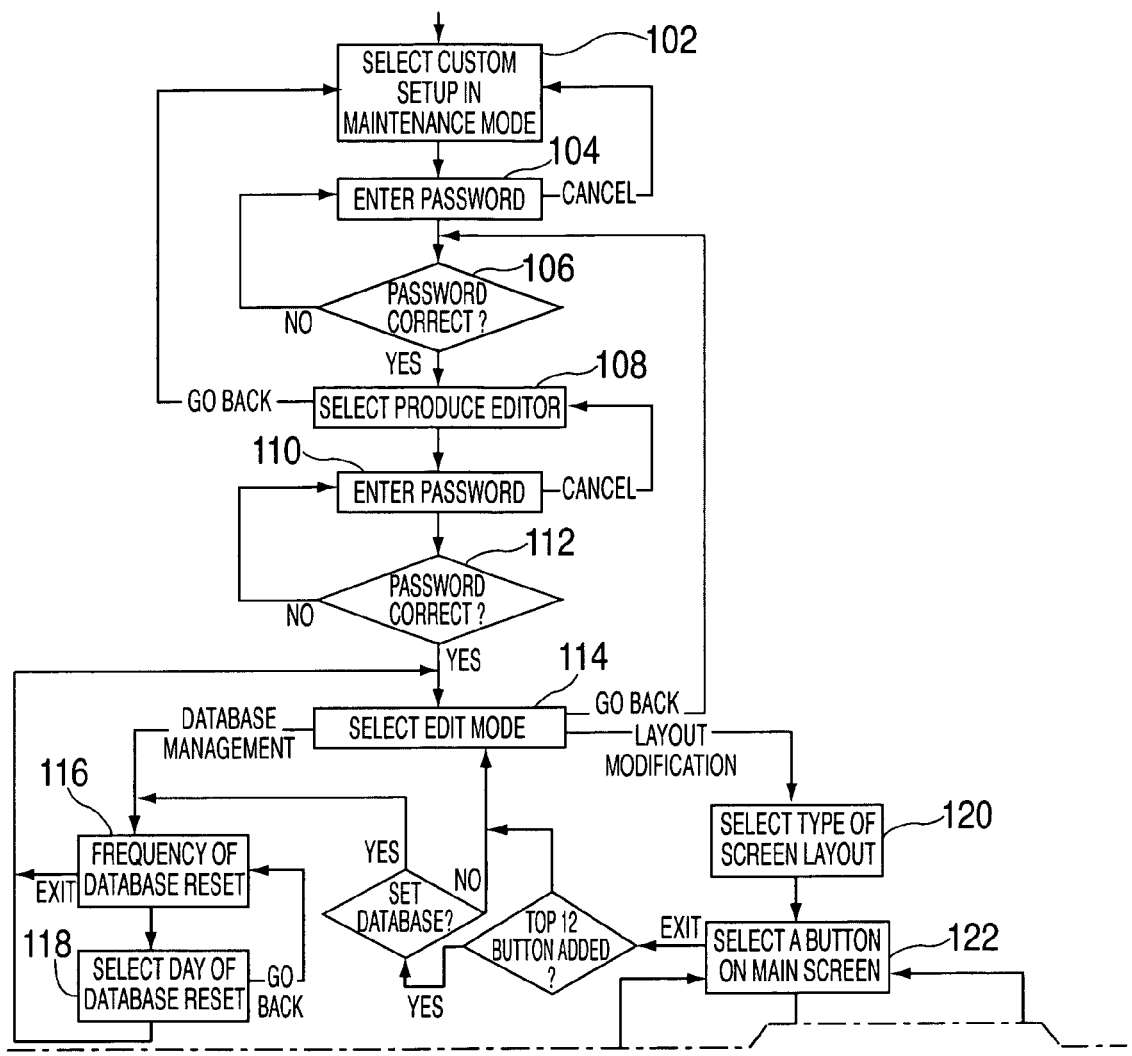
FIG. 29 shows a flow chart for a process, in accordance with an embodiment of the present invention, of setting up a non-bar coded items GUI.
Figure 29B:
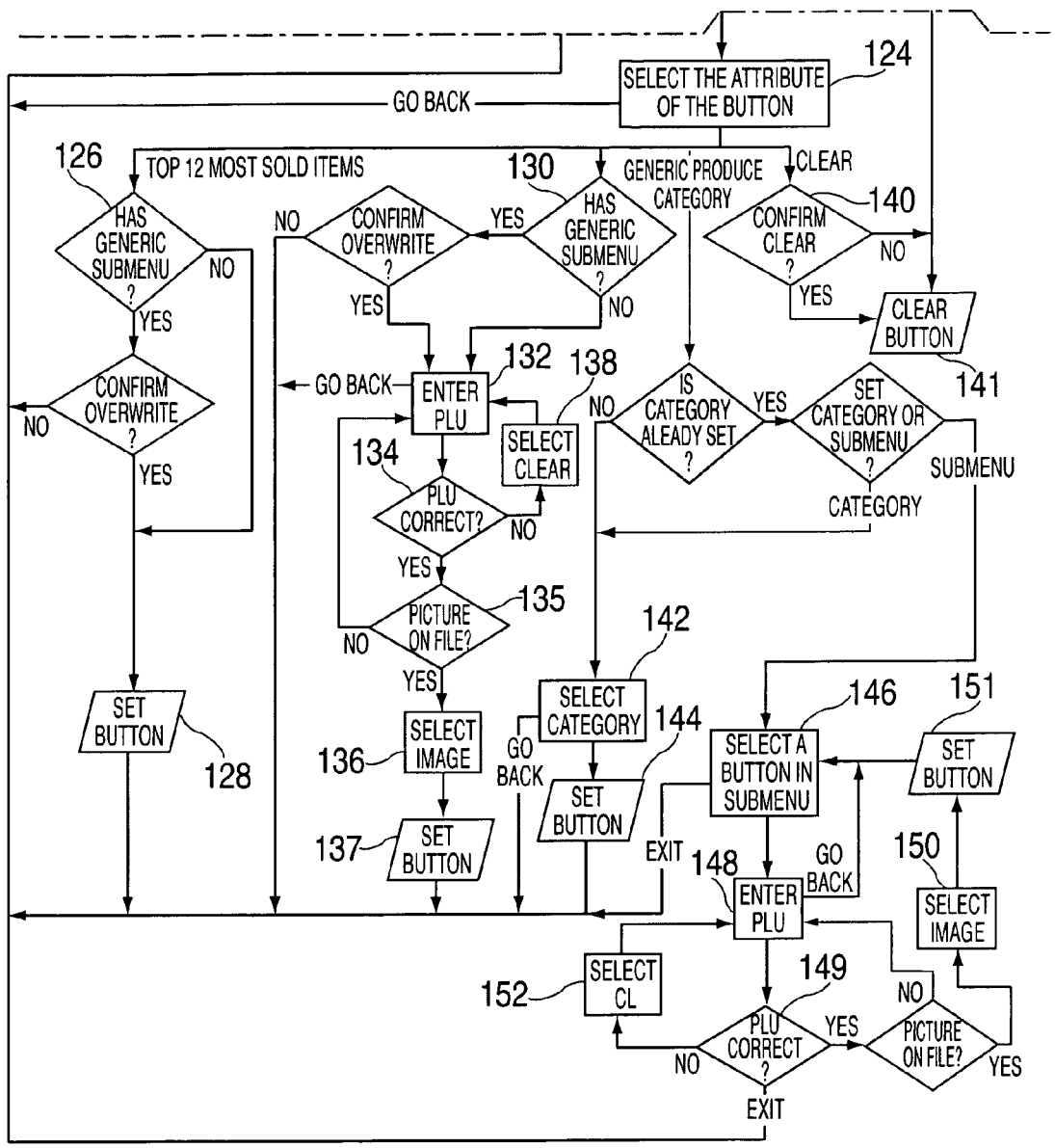

FIG. 27 illustrates how the GUI for non-bar coded items created by the editor process described above might look on the touch screen of a self-checkout terminal. After a customer selects the apples generic category button, the GUI screen shown in FIG. 28 is displayed.

Various changes and modifications of the described embodiments could be effected by one skilled in the art without departing from the spirit or scope of the invention recited in the appended claims. Improvements and modifications which become apparent to persons of ordinary skill in the art after reading this disclosure, the drawings and the appended claims are deemed within the spirit and scope of the present invention. It is therefore contemplated that the appended claims would cover any such modifications or improvements.

What is claimed is:

1. An apparatus for self-checkout of non-bar coded items, comprising:
   a processing unit, wherein the processing unit maintains a list of most frequently sold items, said list of most frequently sold items being a subset of a list of items available for sale by the use of the self-checkout apparatus; and
   a Product Look Up (PLU) entry device having a Graphic User Interface (GUI), wherein the GUI provides display of a plurality of images corresponding to non-bar coded items and where at least one of the plurality of images is selected for display on the GUI based on the selected image's corresponding non-bar coded item being a member of the list of most frequently sold items, and wherein the entry device provides a user with means for selecting ones of the predetermined images of the non-bar coded items to indicate items for purchase by a user.

2. The apparatus of claim 1, wherein the processing unit maintains for each item a count of a number of units of items sold within a predetermined period of time.

3. The apparatus of claim 1, wherein the processing unit updates the list of most frequently sold items as sales take place at checkout terminals.

4. The apparatus of claim 1, wherein the processing unit updates a displayed GUI screen showing frequently sold items when the list of most frequently sold items changes.

5. The apparatus of claim 1, wherein an image of a generic category of items is displayed on the GUI, and the displayed image of the generic category is selected by the user to view images of respective items in the generic category.

6. The apparatus of claim 1, wherein the GUI comprises a touch screen display.

7. The apparatus of claim 1, wherein the GUI is configured to display a graphic keypad.

8. The apparatus of claim 1 further comprising a GUI editor, wherein the GUI editor is used to configure the GUI for non-bar coded items.

9. The apparatus of claim 1 further comprising a PLU database,
   wherein the PLU entry device supplies a PLU corresponding to the non-bar coded item selected by the user, and the processing unit receives and uses the PLU supplied by the PLU entry device to retrieve a price of the selected non-bar coded item from the PLU database.

10. The apparatus of claim 1, wherein the PLU database also stores images of the plurality of items.

* * * * *